April 5, 1932. H. G. ELLIS 1,852,802
LAST SUPPORT
Filed May 6, 1931
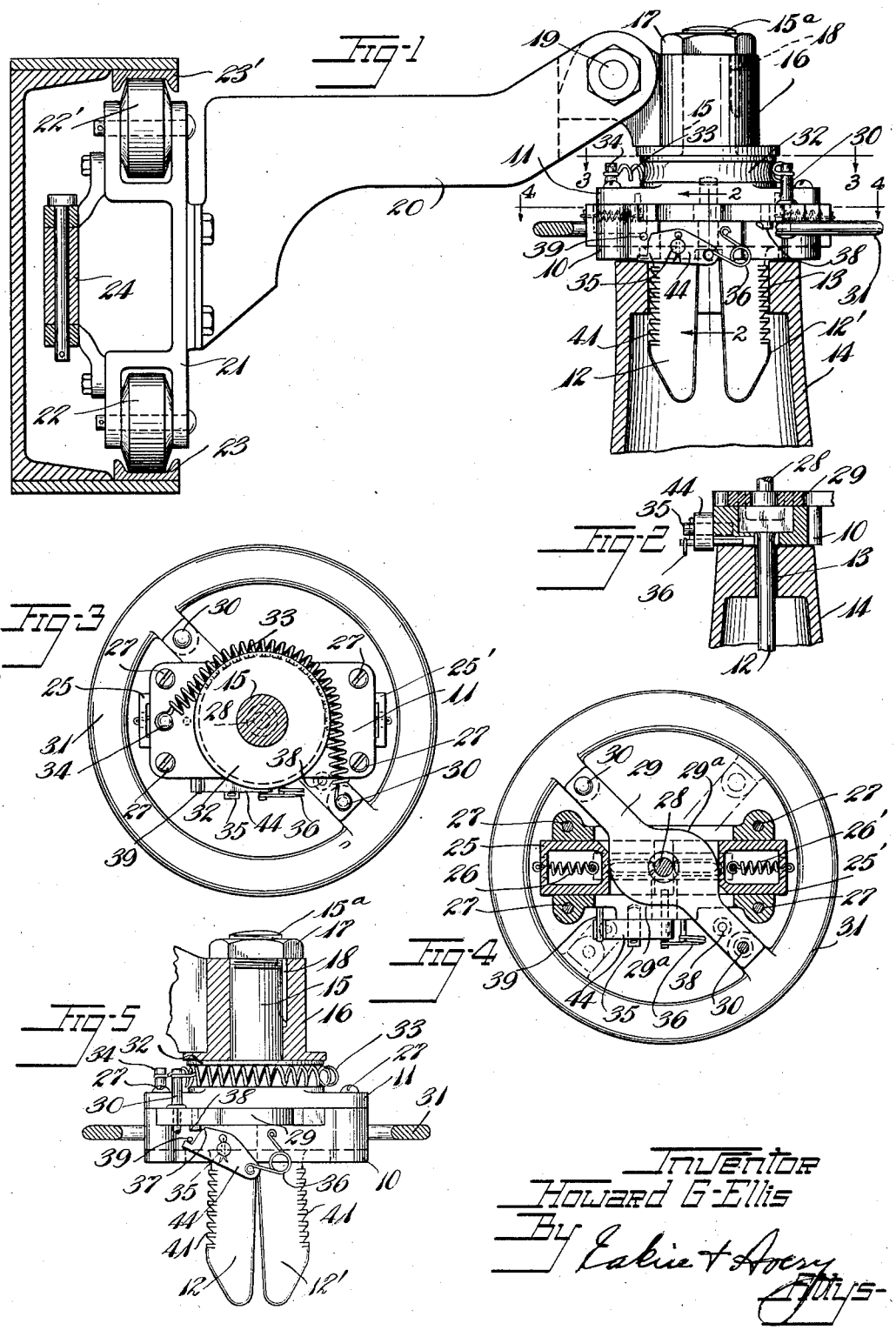

Patented Apr. 5, 1932

1,852,802

UNITED STATES PATENT OFFICE

HOWARD G. ELLIS, OF WALTHAM, MASSACHUSETTS, ASSIGNOR TO THE B. F. GOODRICH COMPANY, OF NEW YORK, N. Y., A CORPORATION OF NEW YORK

LAST SUPPORT

Application filed May 6, 1931. Serial No. 535,400.

My invention relates to last supports such as are used in the manufacture of rubber shoes for holding the lasts upon which the shoes are built.

The objects of my invention are to provide a last-supporting structure which will automatically engage a last, one which will grip the last continuously while supported thereon, and one that may be disconnected from the last without great exertion on the part of the operator.

Further objects will appear from the following description and the accompanying drawings.

In the drawings:

Fig. 1 is a side elevation of a last support of my invention with part of a last engaged therewith, the last being shown in section, and the support being shown as carried on a conveyor, also shown in section.

Fig. 2 is a sectional elevation of a portion of the same taken on line 2—2 of Fig. 1.

Fig. 3 is a sectional plan view on line 3—3 of Fig. 1 of the last gripping mechanism, the shank 15 being shown in section.

Fig. 4 is a sectional plan view on line 4—4 of Fig. 1.

Fig. 5 is an elevation, partly in section, of the mechanism shown in Fig. 2 with the jaws closed and locked, part of the swivel block 16 being broken away.

Referring to the drawings, the device of my invention comprises generally a chuck-body 10 mounted on a face plate 11 and provided with a pair of chuck-jaws 12, 12′ slideably supported in the chuck-body and adapted to engage in a slot 13 in the shank 14 of a last.

The face-plate 11 may be supported in any desired manner from a work bench or from a conveyor so that the last may be adjusted in relation to its supporting structure. In Fig. 1 I have shown the face-plate as provided with a shank 15 having a threaded end 15ª and adapted to engage a swivel-block 16 through an opening provided therein and to be held in place by a nut 17 and a key 18. The swivel-block is adapted to swing about a pivot 19 on the end of a supporting arm 20. Supporting arm 20 projects from a carriage 21 mounted on rollers 22, 22′ in channel tracks 23, 23′ and movable along said tracks by a chain 24. It will be seen that chuck-body 10 is thereby mounted on the conveyor so as to normally stand in a horizontal plane as shown in Fig. 1 but may be adjusted around pivot 19 to other positions in which it may be frictionally held by any suitable clamping mechanism.

The chuck-body 10 is provided with a machined channel in which the heads 25, 25′ of the chuck-jaws 12, 12′ are free to slide to a limited extent determined by the length of a slot provided in chuck-body 10 through which the jaws 12, 12′ project. Chuck-jaws 12, 12′ are preferably angularly disposed to each other, as shown, so that their toothed gripping surfaces 41 are farther apart near the ends thereof than adjacent the chuck-body 10 so that the last is positively held thereon in locked relation thereto. Jaws 12, 12′ are normally urged toward one another by tension springs 26, 26′ each of which engages at its outer end the head of one of the jaws and at its inner end a pin mounted on face-plate 11. Face-plate 11 is attached to chuck-body 10 by screws 27 and forms a cover therefor. Mounted on the under side of the face-plate 11 at the center thereof is a pivot pin 28. A cam 29 having opposed spiral cam surfaces 29ª formed thereon for engaging the jaw-heads 25, 25′ is mounted on said pivot and is provided with opposed arms extending between chuck-body 10 and face-plate 11 in notches provided therefor in which it may be rotated through an angle of 90 degrees.

The ends of the arms are riveted at 30 to a circular rim 31 constituting with the cam 29 a hand wheel operable about pivot 28. Face-plate 11 is provided with a circular shoulder 32 having a concave rim. A tension spring 33 engages a pin 30 on cam 29 at one end and a stationary pin 34 on face-plate 11 at its other end after passing around shoulder 32 in engagement with the groove. This spring normally holds the cam 29 in such a position that jaws 12, 12′ are spaced apart as far as the slot through which they extend will allow. Rotation of the hand wheel 31 in a clock-wise direction (see Figs. 3 and 4) will allow the jaws 12, 12' to approach each other under the influence of springs 26, 26'.

A latch 44 pivoted at 35 on chuck-body 10 is engaged by a spring 36, one end of which engages the latch and the other the chuck-body 10 in such a way as to force a corner 37 of the latch in the path of pin 38 carried by cam 29 when the cam is rotated to the dotted-line position of Fig. 4, and thereby lock the jaws 12, 12' in their closed position, as shown in Fig. 5. A stationary pin 39 limits the motion of the latch 44 under the influence of spring 36.

In the locked position shown in Fig. 5 the end of the latch 44 engaged by the spring 36 extends below the face of the chuck-body 10 and pressure applied thereto in a direction toward the chuck-body will unlatch the cam 29, which, under the influence of spring 33, will force the jaws 12, 12' apart. Jaws 12, 12' are provided with gripping teeth 41 for engaging the last.

The operation of the device is as follows: Assuming that a last is mounted on the support and is ready to be removed, the operator grasps the last with one hand and rotates the wheel 31 with the other through an angle of about 90 degrees in a clock-wise direction, forcing jaws 12, 12' toward each other. As the last is slipped from the jaws latch 44 engages pin 38 and prevents return of the cam. As a second last is slipped onto jaws 12, 12', it contacts with latch 44, releasing cam 29, and spring 33 forces jaws 12, 12' out into gripping engagement with the last. The jaws 12, 12' continue their outward pressure while the last is being operated upon, thereby rigidly supporting the same and the inclined gripping surfaces 41 extending beyond the slot 13 in the last prevent accidental displacement of the last from the support.

I claim:

1. A last supporting device comprising a pair of jaws adapted to be inserted in an opening in a last, means for normally holding said jaws in frictional engagement therewith, manually operable means for returning said jaws to non-engaging position, and automatically operated means for latching said jaws in non-engaging position.

2. A last supporting device comprising a pair of jaws adapted to be inserted in an opening in a last, means for normally holding said jaws in frictional engagement therewith, means opposed thereto for manually releasing said last, and means rendered inoperative by the presence of a last on said device for locking said jaws in non-engaging position.

3. A last supporting device comprising a pair of jaws adapted to frictionally engage a last to rigidly support the same, means for normally holding said jaws in engagement therewith, manually operable cam means for releasing said engagement, a latch for engaging said cam and thereby holding said jaws out of last engaging position, and means carried by said latch and adapted to be displaced by a last when the last is placed on said jaws for releasing said latch and permitting the jaws to move into engagement with the last.

4. A last supporting device comprising an arm, and means supported thereby for gripping a last, said gripping means including a pair of last-engaging jaws and means actuated by the placing of a last in position to be engaged by said jaws for automatically moving said jaws into engagement with the last.

5. A last supporting device as defined by claim 4 in which the last-engaging jaws are angularly disposed to each other so as to lock the last against accidental displacement.

In witness whereof I have hereunto set my hand this 27th day of April, 1931.

HOWARD G. ELLIS.